5 # 3,471,285
PROCESS FOR THE SELECTIVE RECOVERY OF MANGANESE AND IRON FROM ORES

Ramon F. Rolf, Midland, Mich., assignor to The Dow Chemical Company, Midland, Mich., a corporation of Delaware
No Drawing. Filed Mar. 27, 1967, Ser. No. 625,961
Int. Cl. C22b 3/00, 1/00, 47/00
U.S. Cl. 75—103
3 Claims

ABSTRACT OF THE DISCLOSURE

This invention provides a process for the selective separation of manganese and iron values from ores, such as the manganese sea nodules, which likewise contain significant quantities of nickel and cobalt values. The separation is accomplished by first reducing the ore at high temperatures and leaching the reduced ore with ammonium sulfate to concentrate the manganese and iron values in the liquid phase.

BACKGROUND OF THE INVENTION

A process has long been desirable which would enable metal values to be selectively removed from complex ores by a relatively simple and economical process. Available processes, however, have heretofore been inefficient, have involved an undesirable number of steps or have been uneconomical.

SUMMARY OF THE INVENTION

This invention relates to a process for selectively recovering the manganese and iron values from ores containing the same and more particularly relates to a process for the selective recovery of manganese and iron values from ores additionally containing cobalt and nickel values.

It is an object of this invention to provide a process for the selective recovery of manganese and iron from ores containing the same. A further object is to provide a process for selectively recovering manganese and iron values from ores additionally containing cobalt and/or nickel values. A further object is to provide a process for selectively recovering manganese and iron values in specific ratios of manganese to iron. These and other objects and advantages of the present process will become apparent from a reading of the following detailed description.

BRIEF DESCRIPTION OF PREFERRED EMBODIMENTS

It has now been discovered that manganese and iron values are selectively removed from ores containing the same by at least partially reducing the ore at a temperature of from about 400° C. to about 1000° C., preferably from about 550° C. to about 800° C. and leaching the thus reduced ore with an aqueous solution of ammonium sulfate having a pH of from about 4 to about 9. A substantial portion of the manganese and iron values within the ore are thereby solubilized and pass into the aqueous leach phase. By appropriate adjustment of the temperature of reduction, leaching time, and pH of the ammonium sulfate leach solution, the ratio of manganese to iron thereby removed from the ore may be varied from about 10/1 to about 1/1.

Typical ores useful in the process of this invention include hausmannite, pyrolusite, braunite and the like but the process has been found to be particularly effective when applied to manganese sea nodules.

The reduction step is a typical ore reduction achieved by intimately contacting ore in particulate form with gaseous hydrogen, carbon monoxide or mixtures thereof at a temperature of from about 400° C. to about 1000° C. Lower temperature reduction favors the removal of a product having a relatively low manganese to iron ratio, e.g. 1:1, whereas higher reduction temperatures favor the recovery of a product having a relatively high manganese to iron ratio, e.g. 50:1. This is particularly true of manganese sea nodule ores which usually contain about 31 weight percent manganese and 22 weight percent iron. In general, the reduction step is conducted in a period of from about 2 to about 6 hours.

An aqueous leach solution is usually employed which is from about 0.1 to about 4.0 molar in ammonium sulfate and which has a pH of between about 4 and about 9. It is preferred to adjust the pH of the leach solution with ammonia but other basic materials such as inorganic hydroxides, amines or the like may be employed. In general, higher pH of the leach solution favor a higher ratio of manganese to iron in the product and lower pH favors a lower manganese to iron ratio.

The leach solution is contacted with the reduced ore in any suitable manner, e.g. by agitating the particulate ore in a quantity of the leach solution, or by passing the leach solution through a column of particulate ore. After separation, the leached ore may be discarded or it may be further treated to recover other metal values therefrom. Once separated from the insoluble ore, the manganese and iron values contained in the leach solution may be recovered as a relatively concentrated mixture by precipitation with a basic reagent stronger than $Mn(OH)_2$ which yields a soluble product with the anions of the system, e.g. $NH_3$, $(NH_4)_2CO_3$, $NaOH$ or amines are successfully employed. The mixture may then be reduced with carbon to yield ferro-manganese useful in the making of alloyed steel.

The following examples are provided to more fully illustrate the invention but are not meant to limit it thereto.

Example 1

A 0.1811 gram sample of ore having a particle size of about 70 mesh and containing 30 weight percent Mn (47 weight percent $MnO_2$), 10 weight percent Fe (14 percent $Fe_3O_4$), 10 weight percent Si (20 weight percent $SiO_2$), 2.0 weight percent Ni (2.6 weight percent NiO) and 5.0 weight percent Co (7.0 weight percent CoO) plus trace amounts of other metal values was heated to 600° and contacted with a flowing stream of hydrogen for 4 hours. After reduction, the ore was allowed to cool to about room temperature and leached with 100 ml. of a one molar aqueous solution of ammonium sulfate during a period of 30 minutes. The ammonium sulfate leach solution contained sufficient ammonia to provide an initial pH of 5.2. At the end of the leaching step, the pH of the leach solution had increased to 6.1. Analysis of the leach solution showed 97 weight percent of the manganese and 47 weight percent of the iron from the ore sample to be contained in the leach solution but indicated substantially no Ni or Co to be present. The manganese and iron values were precipitated from the leach solution with ammonium carbonate, dried and reduced with carbon to produce a ferro-manganese alloy containing 74 weight percent manganese.

Various modifications can be made in the present invention without departing from the spirit or scope thereof for it is understood that I limit myself only as defined in the appended claims.

I claim:
1. A process for the selective separation of manganese and iron values from ores additionally containing cobalt and nickel which comprises reducing the ore at a temperature of between about 400° C. and about 1000° C. and leaching the reduced ore with an aqueous solution of ammonium sulfate having a pH in the range of from about 4 to about 9 to concentrate the manganese and iron values in the aqueous phase.

2. The process of claim 1 wherein the temperature during the reduction step is between about 550° C. and about 800° C.

3. The process of claim 1 wherein the reduction temperature is about 600° C., the ammonium sulfate leach solution is between about 0.5 and 4.0 molar in ammonium sulfate and pH of said leach solution is between about 5 and about 6.5.

References Cited

UNITED STATES PATENTS

| | | | |
|---|---|---|---|
| 1,932,413 | 7/1925 | Laury | 75—103 X |
| 1,937,508 | 8/1927 | Bradley | 75—103 X |
| 2,662,009 | 12/1953 | Roberts et al. | 75—108 |
| 3,169,856 | 2/1965 | Mero | 75—119 |

FOREIGN PATENTS 785,307    10/1957    Great Britain.

OTHER REFERENCES

Sully, A. H., Metallurgy of the Rarer Metals, volume 3, "Manganese," pp. 66–69, Academic Press, N.Y., 1955.

OSCAR R. VERTIZ, Primary Examiner

G. O. PETERS, Assistant Examiner

U.S. Cl. X.R.

23—117; 75—80, 115